(12) United States Patent
Barnett et al.

(10) Patent No.: US 12,019,894 B2
(45) Date of Patent: Jun. 25, 2024

(54) SYSTEMS AND METHODS FOR MANAGING CORESIDENT DATA FOR CONTAINERS

(71) Applicant: Dell Products L.P., Round Rock, TX (US)

(72) Inventors: Alan Barnett, County Cork (IE); David Bowden, County Cork (IE); Merry Globin, County Cork (IE)

(73) Assignee: DELL PRODUCTS L.P., Round Rock, TX (US)

( * ) Notice: Subject to any disclaimer, the term of this patent is extended or adjusted under 35 U.S.C. 154(b) by 16 days.

(21) Appl. No.: 17/884,699

(22) Filed: Aug. 10, 2022

(65) Prior Publication Data

US 2024/0053914 A1 Feb. 15, 2024

(51) Int. Cl.
*G06F 3/06* (2006.01)

(52) U.S. Cl.
CPC .......... *G06F 3/0647* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 9,904,482 | B1 * | 2/2018 | Chakraborty | G06F 11/1458 |
| 2007/0055826 | A1 * | 3/2007 | Morton | G06F 12/0817 |
| | | | | 711/E12.027 |
| 2014/0029616 | A1 * | 1/2014 | Chang | G06F 9/4405 |
| | | | | 370/392 |
| 2014/0032853 | A1 * | 1/2014 | Lih | G06F 12/0817 |
| | | | | 711/141 |
| 2014/0040561 | A1 * | 2/2014 | Lih | G06F 12/0831 |
| | | | | 711/146 |
| 2017/0366606 | A1 * | 12/2017 | Ben-Shaul | G06F 3/061 |
| 2018/0365151 | A1 * | 12/2018 | Zoellin | G06F 12/0822 |
| 2020/0218656 | A1 * | 7/2020 | Graves, Jr. | G06F 3/0607 |

OTHER PUBLICATIONS

"ECS Overview and Architecture", H14071.21, Dell Technologies, Feb. 2022. (59 pages).
"Dell ObjectScale General Reference Architecture", H19080, Dell Technologies, Feb. 2022. (9 pages).

* cited by examiner

*Primary Examiner* — William E. Baughman
(74) *Attorney, Agent, or Firm* — Chamberlain, Hrdlicka, White, Williams & Aughtry; Aly Z. Dossa

(57) ABSTRACT

A method for providing a coresident copy of external container data, that includes identifying, via a cluster storage manager, an access request to a cluster storage for external container data, where the access request is sent from a container executing on a first host, making a determination that the external container data is not stored on the first host, and based on the determination, copying the external container data from a second host to the first host to provide the coresident copy of the external container data.

14 Claims, 3 Drawing Sheets

SYSTEMS AND METHODS FOR MANAGING CORESIDENT DATA FOR CONTAINERS

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

DETAILED DESCRIPTION

Figure 1:
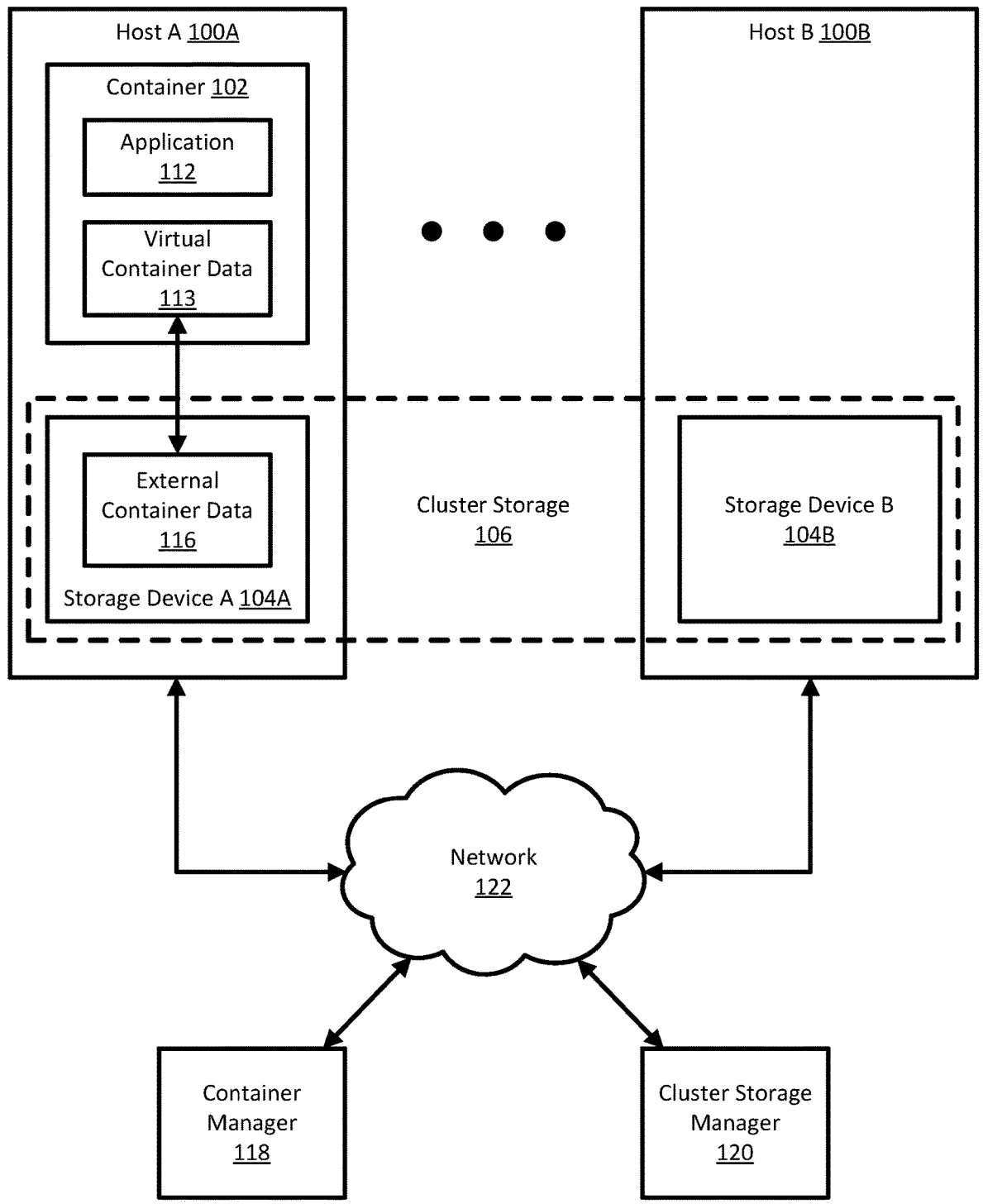
FIG. 1 shows a diagram of system, in accordance with one or more embodiments.

In general, embodiments relate to system and methods migrating external container data to reside on the same host executing the container. Accordingly, once migrated, the container and the container data "co-reside" on the same host, thereby eliminating the need to utilize external hosts and other resources (e.g., a network) to maintain access to the external container data.

Traditionally, container environments are designed to primarily handle "stateless" containers (e.g., containers not needing the continued use of any data generated by the container). However, practical applications often require "stateful" containers, such as databases and application servers where continued use of generated data is a necessity. Further, it is important for the resilience and scalability of an application (executing in the container) that stateful containers are free to move between hosts of the larger system.

Yet, container management software (e.g., a container manager) provides capabilities for externalizing the data generated by a container (e.g., its files) on a single host, but not between hosts. Thus, to externalize state-essential files (e.g., "external container data", data needed by the container for future use) between hosts, some external storage must be accessible by the container and used to store the state-essential files. To accomplish this, containers are connected to such external storage systems (e.g., cluster storage) over a network, which allows the external state-essential files to be accessed by their associated containers on any host connected to the cluster storage system.

As described herein, one or more systems and methods provide for the implementation of a common storage plane, co-resident with the container hosts, which allows a container to access its external storage on the local host. One way to implement such a system is via distributed storage file caching that migrates state-essential files to the hosts currently running the container. Such a system increases the performance of the distributed applications as data access speed is increased and network latency is eliminated (or greatly reduced). One such example of dynamic caching mechanisms is a "Least Recently Used Algorithm" approach, which bases its caching strategy on read/write access requests and sends files to the host where they are most needed, or most likely to be needed, as well as deleting files which have not been accessed in a specified timeframe from a host. In such scenarios, the original copy of the file is maintained and generally one or more additional copies are propagated on other hosts for resilience purposes.

Importantly, using one or more method(s) related to storage caching provides a mechanism that is independent of any container orchestrator (e.g., a container manager such as Kubernetes®, Docker® Swarm, etc.). Instead, direct utilization of the container's file access capabilities may be utilized (e.g., Docker's® storage plug-in facility that provides common storage interface plugins for container-to-storage access). Thus, container data transfer via caching can be built independently of any container orchestrator-specific protocols, and utilized in new installations or retrofitted into existing installations without burdensome configuration modifications.

In one or more embodiments described herein, methods and system provide for installing a distributed object storage solution (e.g., a software-defined storage (SDS) service, a cluster storage manager) on the same infrastructure hosts as the containers, typically utilizing the host's own directly attached storage (DAS) devices. Collectively, the storage devices of the hosts provide the cluster storage, in a distributed peer-to-peer design pattern. Further, in one or more embodiments, a specialized container storage driver may be used, by the container, to connect the external container data to the cluster storage. That is, the external container data is mapped to one or more storage object(s) of the cluster storage, where the distributed object storage solution provides caching, distribution, and resiliency for the mapped external container data on the cluster storage.

Further, while the distributed object storage solution (performing the caching) is independent and does not communicate with any container orchestrator, the distributed object storage solution is still responsive to the actions of the container orchestrator. As a non-limiting example, if a container orchestrator moves a container to a new host, the distributed object storage solution recognizes that the container is accessing the external container data from a new host and therefore caches the file objects to the new host, as needed. Thus, such "smart" caching causes the container's external container data to follow the container to whichever host is executing the container, without utilization of the container orchestrator.

As another non-limiting example, when a container moves from one host to another (e.g., an "old" host to a "new" host), the container accesses its external container data from the new host. If the external container data are already stored on the new host, they are locally accessible to the container, without needing to communicate with the old host. However, if the external container data is on a different host (e.g., the old host), the external container data is automatically moved and cached at the new host (leveraging built-in caching functionality of the underlying distributed object storage solution. Thus, after a short period of time, all the container external data is cached locally on the new host, reducing file access times substantially. As containers typically move infrequently, the initial movement and caching of the file objects is likely to be a small proportion of the overall file access, thus this mechanism causes very little overhead. Additionally, if a container frequently migrates between a limited set of hosts, those hosts each maintain a copy of that container's file (as the cached data remains until removed by some algorithm).

Herein, specific embodiments will be described with reference to the accompanying figures. In the following description, numerous details are set forth as examples of one or more embodiments. One of ordinary skill in the art, having the benefit of this detailed description, would appreciate that one or more embodiments provided in this disclosure may be practiced without these specific details and that numerous variations or modifications may be possible without departing from the scope of broader embodiments. Certain details, known to those of ordinary skill in the art, may be omitted to avoid obscuring the description and for brevity. Further, the scope should be limited only by the attached claims.

In the following description of the figures, any component described with regard to a specific figure may be equivalent to one or more like-named components shown and/or described in any other figure. For brevity, descriptions of these components may not be repeated with regard to each figure. Thus, each and every embodiment of the components of each figure is incorporated by reference and assumed to be optionally present within every other figure that includes one or more like-named components. Additionally, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term "operatively connected" (or "operative connection") means that there exists between devices a direct or indirect connection that allows the devices to interact with one another in some way (e.g., via the exchange of information). For example, the phrase 'operatively connected' may refer to any direct connection (e.g., wired connection or wireless connection directly between two devices) or indirect connection (e.g., wired and/or wireless connections between any number of devices connecting the operatively connected devices).

As used herein, the adjectives "source", "destination", and "intermediate" are for explanatory purposes only. That is, the components, devices, and collections of devices described using these adjectives are meant only to provide a better understanding to the reader in the context of a particular scenario—not to generally limit the capabilities of those components, devices, and collections of devices. As an example, a "component" may perform certain operation when acting as a "source component" and may perform some of the same and other operations when acting as a "destination component". However, each "component" (whether it be "source" or "destination") may be fully capable of performing the operations of either role.

As used herein, the word "data" is treated as an "uncountable" singular noun—not as the plural form of the singular noun "datum". Accordingly, throughout the application, "data" is paired with a singular verb when written (e.g., "data is"). However, this usage should not be interpreted to redefine "data" to exclusively mean a single bit of information. Rather, as used herein, "data" means any one or more bit(s) of information that are logically and/or physically grouped. Further, "data" may be used as a plural noun if context provides the existence of multiple "data" (e.g., "two data are combined").

FIG. 1 shows a diagram of system, in accordance with one or more embodiments. In one or more embodiments, the system includes one or more hosts (100), cluster storage (106) spanning the hosts (100), a network (122), a container manager (118), and a cluster storage manager (120). Each of these components is described below.

In one or more embodiments, a host (e.g., host A (100A), host B (100B)) is a computing device that includes one or more storage device(s) (104) and is executing one or more container(s) (102). In one or more embodiments, a computing device is hardware that includes:
  (i) processor(s),
  (ii) memory (volatile and/or non-volatile),
  (iii) persistent storage device(s) (e.g., storage device A (104A), storage device B (104B)),
  (iv) internal physical interface(s) (e.g., serial advanced technology attachment (SATA) ports, peripheral component interconnect (PCI) ports, PCI express (PCIe) ports, next generation form factor (NGFF) ports, M.2 ports, etc.),
  (v) external physical interface(s) (e.g., universal serial bus (USB) ports, recommended standard (RS) serial ports, audio/visual ports, etc.),
  (vi) communication interface(s) (e.g., network ports, small form-factor pluggable (SFP) ports, wireless network devices, etc.),
  (vii) input and output device(s) (e.g., mouse, keyboard, monitor, other human interface devices),
  (viii) or any combination thereof.

Further, in one or more embodiments, the persistent storage (and/or memory) of the computing device may store computer instructions (e.g., computer code) which, when executed by the processor(s) of the computing device (e.g., as software), cause the computing device to perform one or more processes specified in the computer instructions. Non-limiting examples of a computing device include a general purpose computer (a personal computer, desktop, laptop, tablet, smart phone), a network device (e.g., switch, router, multi-layer switch, etc.), a server (e.g., a blade-server in a blade-server chassis, a rack server in a rack, etc.), a controller (e.g., a programmable logic controller (PLC)), and/or any other type of computing device with the aforementioned capabilities.

In one or more embodiments, a container (e.g., container (102)) is software executing on a host (100) and is managed by a container manager (118). In one or more embodiments, where the container (102) is executing as an isolated software instance, the container (102) may establish a semi-isolated virtual environment in which to execute one or more application(s) (e.g., application (112)) and provide virtualized data components (e.g., virtual memory, virtual container data (113)). A container (102) may be executing in the "user space" the host (100) operating system (e.g., a layer of software that utilizes low-level system components for the execution of software). As a non-limiting example, a container may be a Docker® container.

In one or more embodiments, an application (e.g., application (112)) is software executing in a container (102), that may include instructions which, when executed by a processor of the host, initiate the performance of one or more operations of the host (100). As the application (112) is executing within the container (102), the application is provided an isolated environment with access to virtualized components of the host (100). As a non-limiting example, the application may be provided access to virtual container data (113) to read and write to (unaware of the actual storage device(s) (104) holding the data).

In one or more embodiments, virtual container data (e.g., virtual container data (113)) is simulated data that mimics the external container data (116) stored on the physical storage device (104) of the host (100). That is, an application (112) may not be configured to identify the physical storage devices of the hardware of the host (100); rather, the application (112) relies on the container (102) and the host (100) to translate virtual components (e.g., virtual container data (113)) to physical components of the host (100) (e.g., external container data (116)). Accordingly, in one or more embodiments, an application may utilize virtual container data (113) to read, write, and/or otherwise manipulate data, without being configured to directly access the physical storage device (104) on which the external container data (116) resides. In one or more embodiments, the container (102), the container manager (118), and/or the operating system (not shown) provides a mapping between the virtual container data (113) and the external container data (116). The virtual container data (113) may be stored (and manipulated) in a reserved region of memory of the host (100) while the external container data (116) is stored on a storage device (104). In one or more embodiments, the application (112) may write any type or form of data to the virtual container data (113). Non-limiting examples of virtual container data (113) include software operation data (e.g., application logs, container logs, configuration data, etc.) and generated user data (e.g., financial transactions, media files, sensor data, etc.).

In one or more embodiments, a storage device (e.g., storage device A (104A), storage device B (104B)) is one or more hardware devices capable of storing digital information (e.g., data) in a non-transitory medium. Non-limiting examples of a storage device (104) include integrated circuit storage devices (e.g., solid-state drive (SSD), Non-Volatile Memory Express (NVMe), etc.), magnetic storage (e.g., hard disk drive (HDD), floppy disk, tape, diskette, etc.), or optical media (e.g., compact disc (CD), digital versatile disc (DVD), etc.). In one or more embodiments, storage (104) may include one or more devices designated as "memory" (e.g., flash memory, random access memory (RAM), dynamic RAM (DRAM), static RAM (SRAM), resistive RAM (ReRAM), non-volatile dual in-line memory module (NVDIMM), etc.).

In one or more embodiments, external container data (e.g., external container data (116)) is data physically written to a storage device (104) on a host (100). External container data (116) is accessible and/or modifiable (readable and/or writable) by the container (102) (and indirectly by the application (112) executing therein via the virtual container data (113)). In one or more embodiments, the container (102) reads and/or writes to the storage device (104) via accessing the cluster storage (106) as managed by the cluster storage manager (120). Similar to virtual container data (113) as discussed above, non-limiting examples of external container data (116) (written via the virtual container data (113)) include software operation data (e.g., application logs, container logs, configuration data, etc.) and generated user data (e.g., financial transactions, media files, sensor data, etc.). In one or more embodiments, a specialized container storage driver (not shown) is installed as part of the container to provide a mapping of each file in the external container data (116) to corresponding data object(s) in the cluster storage (106).

In one or more embodiments, data is digital information stored in a storage device (104) (and/or memory) and may include one or more individual data components (e.g., blocks, files, records, etc.) that may be separately read, copied, erased, and/or otherwise modified. One of ordinary skill in the art, having the benefit of this detailed description, would appreciate what data is and how data is used by computing devices.

In one or more embodiments, cluster storage (e.g., cluster storage (106)) is one or more virtualized volume(s) of storage that span two or more storage devices (104). As a non-limiting example, as shown in FIG. 1, cluster storage (106) spans at least two storage devices (storage device A (104A) and storage device B (104B)) across at least two hosts (host A (100A) and host B (100B)). Cluster storage (106) may be utilized by any computing system connected to the network (122) to gain the benefit of the data redundancy, availability, mobility, and/or scalability provided by the cluster storage manager (120) managing the cluster storage (106).

In one or more embodiments, a cluster storage manager (e.g., cluster storage manager (120)) is software executing on a computing system that manages the cluster storage (106). A cluster storage manager (120) may be executing on one of the hosts (100) or on some other computing device (not shown) operatively connected to the network (122). A cluster storage manager (120) may include the capability to perform any operation (read, write, and/or delete) to the data residing on the storage devices (104) of the cluster storage (106). Further, the cluster storage manager (120) may monitor for any access requests (read requests and/or write requests) made to the cluster storage (106) and perform one or more operation(s) on the data residing on the cluster storage (106) (e.g., move data, copy data, etc.). As a non-limiting example, a cluster storage manager (120) may be used to actively provide redundancy, availability, mobility, and scalability of the data stored on the cluster storage (106). Specifically, one such active management task is the caching of data on two or more hosts (100) (i.e., a caching mechanism), such that the cached data is more quickly available to any host (100) storing the cached data. Further, the cluster storage manager (120) may use one or more algorithms (e.g., an LRU, first-in-first-out (FIFO), time aware least recently used (TLRU), etc.) to free up stale and/or under used cached data. In one or more embodiments, a cluster storage manager agent (not shown) may be installed on each host (100) that includes a storage device (104) that is part of the cluster storage (106) to provide one or more of the functionalities of the cluster storage manager (120). Non-limiting examples of a cluster storage manager (120) include any distributed object storage solution, software-defined storage (SDS) service, or storage hypervisor, such as Dell® Elastic Cloud Storage (ECS), VMware® Software-Defined Storage Solutions, IBM® Spectrum Scale, and Nutanix storage solutions.

In one or more embodiments, a container manager (e.g., container manager (118)) is software executing on a computing system that controls the creation, execution, maintenance, and/or configuration of one or more container(s) (102). In one or more embodiments, a container manager (118) may initiate (or otherwise cause) a container (102) to move (i.e., migrate) from one host to another host (e.g., from host A (100A) to host B (100B)). A container manager (118) may be executing on a host (100) or on some other computing device (not shown) operatively connected to the network (122). Non-limiting examples of a container manager (118) include any container orchestrator such as Kubernetes®, Docker® Swarm, and Containerd®.

In one or more embodiments, a network (e.g., network (122)) is a collection of connected network devices (not shown) that allow for the communication of data from one network device (not shown) to other network devices (not shown), or the sharing of resources among network devices (not shown). Non-limiting examples of a network (e.g., network (122)) include a local area network (LAN), a wide area network (WAN) (e.g., the Internet), a mobile network, or any other type of network that allows for the communication of data and sharing of resources among network devices and/or devices operatively connected to the network (122). One of ordinary skill in the art, having the benefit of this detailed description, would appreciate that a network is a collection of operatively connected computing devices that enables communication between those devices.

While FIG. 1 shows a specific configuration of a system, other configurations may be used without departing from the scope of the disclosed embodiments. Accordingly, embodiments disclosed herein should not be limited to the configuration of devices and/or components shown in FIG. 1.

Figure 2:
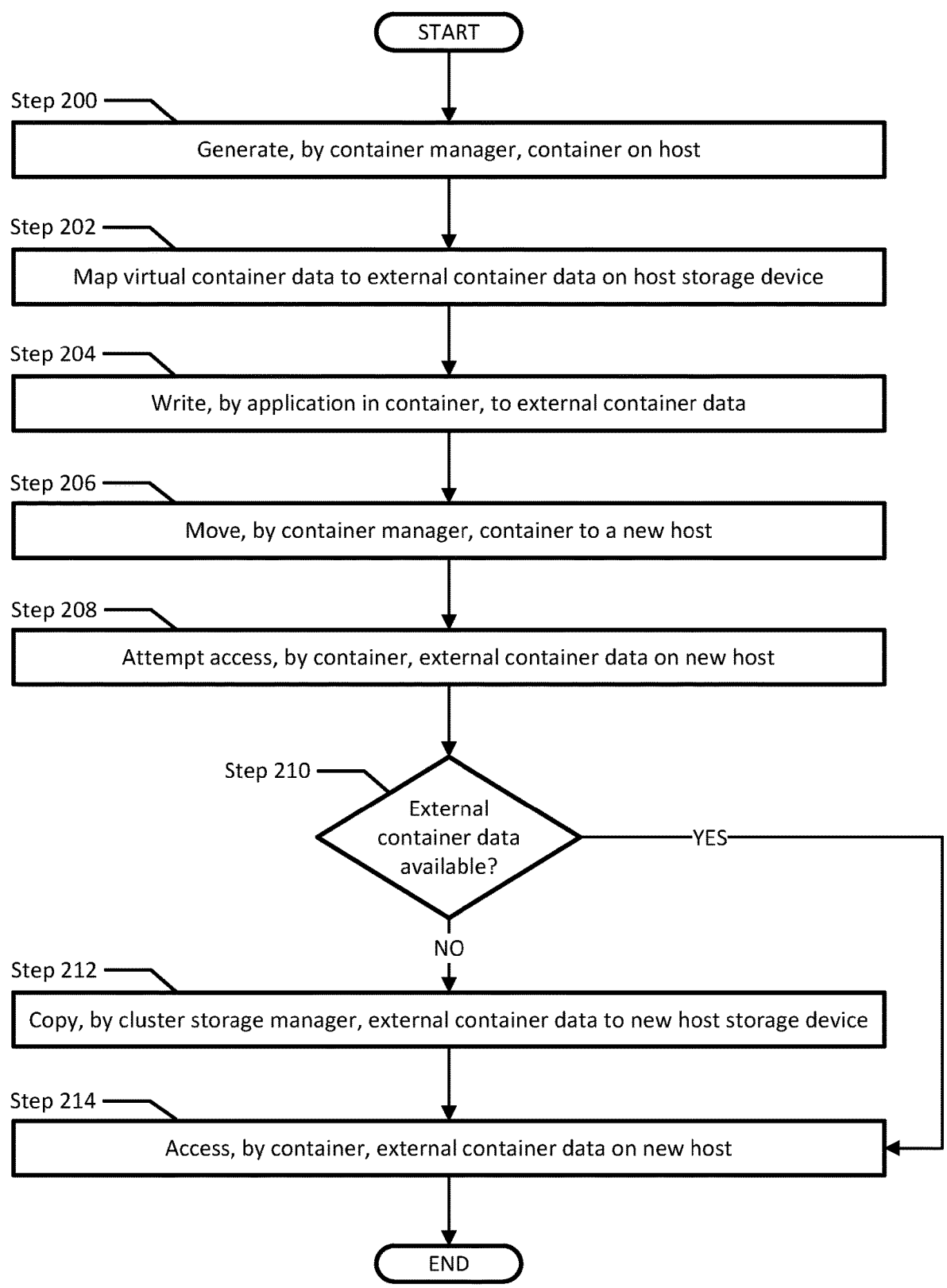
FIG. 2 shows a flowchart of a method of copying external container data to be co-resident with the host executing the container, in accordance with one or more embodiments.

FIG. 2 shows a flowchart of a method of copying external container data to be co-resident with the host executing the container, in accordance with one or more embodiments. All or a portion of the method shown may be performed by one or more components of the system. While the various steps in this flowchart are presented and described sequentially, one of ordinary skill in the relevant art will appreciate that some or all of the steps may be executed in different orders, combined, or omitted, and some or all steps may be executed in parallel.

In Step 200, the container manager generates a container on a host. In one or more embodiments, the container manager creates the container by sending one or more command(s) (or requests) to the host to create the container. In turn, the host performs processes to generate and execute the container. An application may begin to execute in the container after the container is created.

In Step 202, the container manager maps the virtual container data (of the container) to external container data stored on a storage device of the host. In one or more embodiments, the mapping between the virtual container data and the external container data may be made when the container is generated. Further, a specialized container storage driver may be used, by the container, to connect the external container data to the cluster storage (e.g., providing a mapping between files of the external container data and the objects of the cluster storage).

In Step 204, the application writes data to the external container data. In one or more embodiments, during the normal operation of the application (executing in the container), the application writes data to the storage device of the host via the virtual container data mapped to the external container data. That is, the application (unaware that it is executing in a container) writes data to the virtual container data. In turn, the container passes write request to the cluster storage (e.g., using the special storage driver) for the data to be written to the external container data residing on a storage device of the host.

In Step 206, the container manager initiates the transfer of the container to a new host. In one or more embodiments, the container manager may initiate the transfer of the container to a new host by sending one or more command(s) to the first host to shut down the container then sending one or more command(s) to the new host to generate the same container (a container with the same configuration and application). Initiating the generation of the container on the new host may be substantially the same as the process described in Step 200. In one or more embodiments, the container manager may be caused to move the container to a new host for any number of reasons (e.g., load balancing, maintenance, user input, scheduled task, etc.).

In Step 208, the container (executing on the new host) generates an access request (i.e., a read/write request) to the cluster storage for the external container data. In one or more embodiments, the application accesses the virtual container data of the container, which causes the container to access the external container data in the cluster storage. The container may use the specialized container storage driver to make the access request to the cluster storage, providing a mapping to the external container data stored on the cluster storage.

In Step 210, the cluster storage manager makes a determination if the external container data is available on the new host (i.e., in a storage device on the new host). In one or more embodiments, the cluster storage manager monitors access requests (read requests and write requests) to any storage device included in the cluster storage. Additionally, the cluster storage manager may further analyze the available and accessible storage on any particular host. Specifically, the cluster storage manager may read the access request and determine if the specified external container data is located on the host executing the container.

If the cluster storage manager determines that the external container data is not available on the new host (Step 210-NO), the method proceeds to Step 212. In one or more embodiments, when the external container data is not locally available on the new host, the container proceeds to access the external container data on the old host (via the network). However, if the cluster storage manager determines that the external container data is available on the new host (Step 210-YES), the method proceeds to Step 214.

In Step 212, the cluster storage manager copies the external container data from the previous host to the new host. The cluster storage manager may initiate the copying of the external container data by sending one or more command(s) to the previous host, the new host, or both to cause the data to be copied over the network. In one or more embodiments, the cluster storage monitor may delete the external container data stored on the previous host (e.g., as determined by an algorithm used to remove unused or under used data).

In Step 214, the container accesses the external container data on the new host for the current (or any future) access requests. As the external container data was copied to a storage device of the new host, the container's access request may be serviced locally within the new host (without necessitating the use of the network).

Figure 3:
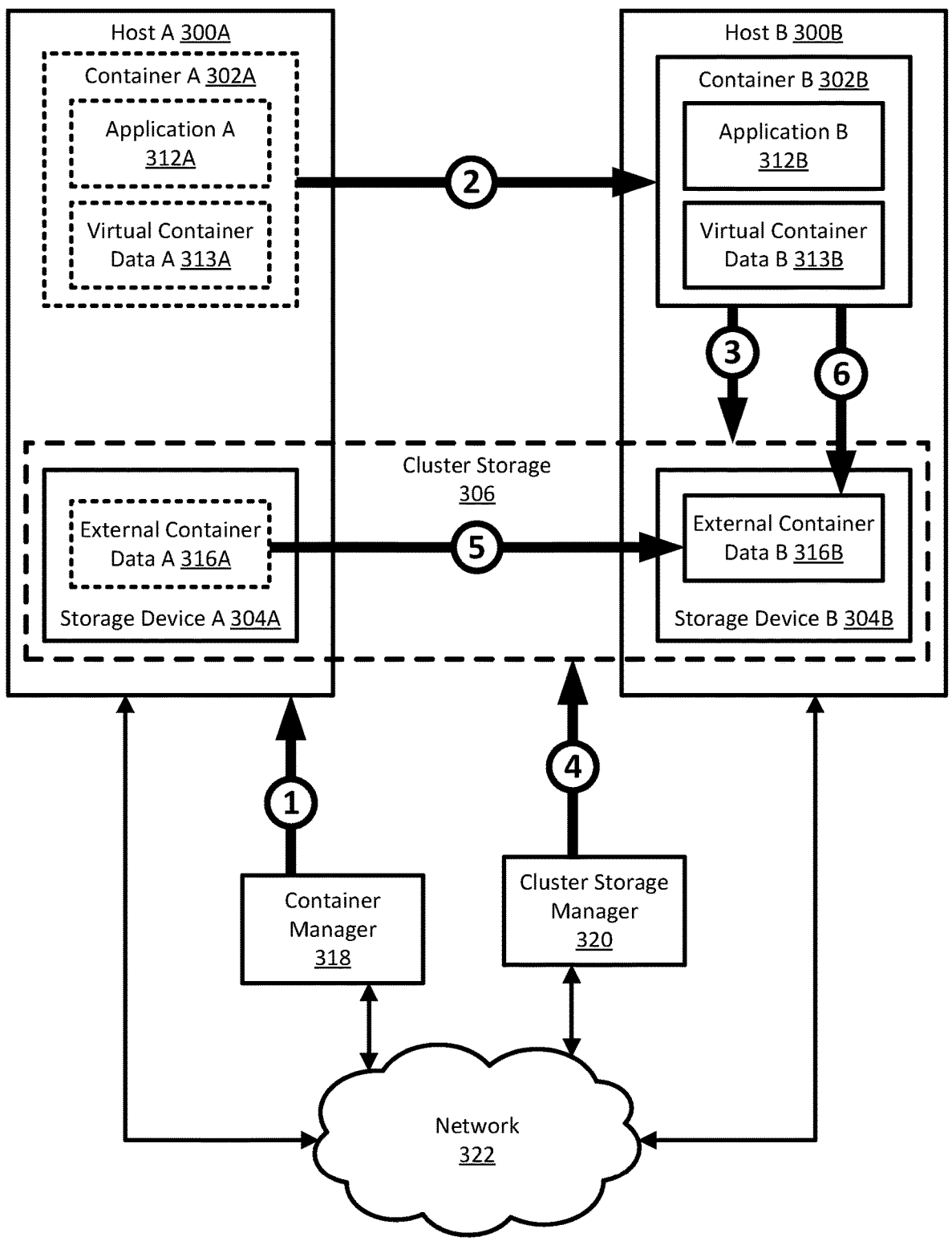
FIG. 3 shows an example of a method of copying external container data to be co-resident with the host executing the container, in accordance with one or more embodiments.

FIG. 3 shows an example of a method of copying external container data to be co-resident with the host executing the container, in accordance with one or more embodiments. The following use case is for explanatory purposes only and not intended to limit the scope to this embodiment. In FIG. 3, consider a scenario in which At (1), the container manager (318) initiates the transfer of container A (302A) from host A (300A) to host B (300B). The container manager (318) sends a command to host A (300A) to shut down container A (300A), and the container manager (318) sends a command to host B (300B) to start new container B (302B) with the same configuration as container A (302A).

At (2), host A (300A) shuts down container A (302A) (including application A (312A) and virtual container data A (313A) therein). Further, host B (300B) generates and executes container B (302B) with application B (312B) and virtual container data B (313B) therein.

At (3), application B (312B) makes an access request to virtual container data B (313B) of container B (302B). In turn, container B (302B) then accesses external container data A (316A) on the cluster storage (306) via the network (322) (still stored storage device A (304A) on host A (300A)).

At (4), the cluster storage manager (320) identifies the access request from container B (302B) to external container data A (316A) on storage device A (304A) of host A (300A). To prevent continued and increased usage of the network (322) to transfer data to and from container B (302B) and storage device A (304A), the cluster storage manager (320) initiates a transfer of external container data A (316A) to storage device B (304B) by sending a copy command to host A (300A) to copy external container data A (316A) to host B (300B).

At (5), host A (300A) copies external container data A (316A) to storage device B (304B) of host B (300B). Host A (300A) sends external container data A (316A) via the network (322) where it is received by host B (300B) and written to storage device B (304B) as external container data B (316B).

At (6), container B (302B) successfully accesses external container data B (316B) on storage device B (304B) for any future access requests for the external container data (316). Further, as external container data B (316B) co-resides on the same host (host B (300B)) as container B (302B), there is no need to transfer that data over the network (322). Accordingly, any future reads and writes to external container data B (316B) may be made locally within the host (300B) thereby saving bandwidth of the network (322) and resource utilization of remote hosts (e.g., host A (300A)) that would otherwise store the requested data.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for providing a coresident copy of external container data, comprising:
   initiating a transfer of a container from a second host to a first host to cause the container to execute on the first host;
   identifying, via a cluster storage manager, an access request to a cluster storage for external container data, wherein the access request is sent from the container executing on the first host to the second host;
   making a determination that the external container data is not stored on the first host; and
   based on the determination:
      identifying that the external container data is stored on the second host; and
      initiating a transfer of the external container data from the second host to the first host to provide the coresident copy of the external container data on the first host.

2. The method of claim 1, wherein copying the external container data from the second host to the first host uses a caching mechanism of the cluster storage manager.

3. The method of claim 1, wherein after copying the external container data from the second host to the first host, the method further comprises:
   deleting the external container data stored on the second host.

4. The method of claim 1, wherein the cluster storage spans the first host and the second host.

5. The method of claim 4, wherein the access request is made via a specialized container storage driver that allows for the container to access the cluster storage.

6. A non-transitory computer readable medium comprising instructions which, when executed by a processor, enables the processor to perform a method for providing a coresident copy of external container data, comprising:
   initiating a transfer of a container from a second host to a first host to cause the container to execute on the first host;
   identifying, via a cluster storage manager, an access request to a cluster storage for external container data, wherein the access request is sent from the container executing on the first host;
   making a determination that the external container data is not stored on the first host; and
   based on the determination:
      identifying that the external container data is stored on the second host; and
      initiating a transfer of the external container data from the second host to the first host to provide the coresident copy of the external container data on the first host.

7. The non-transitory computer readable medium of claim 6, wherein copying the external container data from the second host to the first host uses a caching mechanism of the cluster storage manager.

8. The non-transitory computer readable medium of claim 6, wherein after copying the external container data from the second host to the first host, the method further comprises:
   deleting the external container data stored on the second host.

9. The non-transitory computer readable medium of claim 6, wherein the cluster storage spans the first host and the second host.

10. The non-transitory computer readable medium of claim 9, wherein the access request is made via a specialized container storage driver that allows for the container to access the cluster storage.

11. A computing system, comprising:
   memory; and
   a processor executing a cluster storage manager, wherein the cluster storage manager is configured to perform a method for providing a coresident copy of external container data, comprising:
      initiating a transfer of a container from a second host to a first host to cause the container to execute on the first host;
      identifying, via a cluster storage manager, an access request to a cluster storage for external container data, wherein the access request is sent from the container executing on the first host;
      making a determination that the external container data is not stored on the first host; and
      based on the determination:
         identifying that the external container data is stored on the second host; and
         initiating a transfer of the external container data from the second host to the first host to provide the coresident copy of the external container data on the first host.

12. The computing system of claim 11, wherein copying the external container data from the second host to the first host uses a caching mechanism of the cluster storage manager.

13. The computing system of claim 11, wherein the cluster storage spans the first host and the second host.

14. The computing system of claim 13, wherein the access request is made via a specialized container storage driver that allows for the container to access the cluster storage.

* * * * *